Patented Nov. 30, 1926.

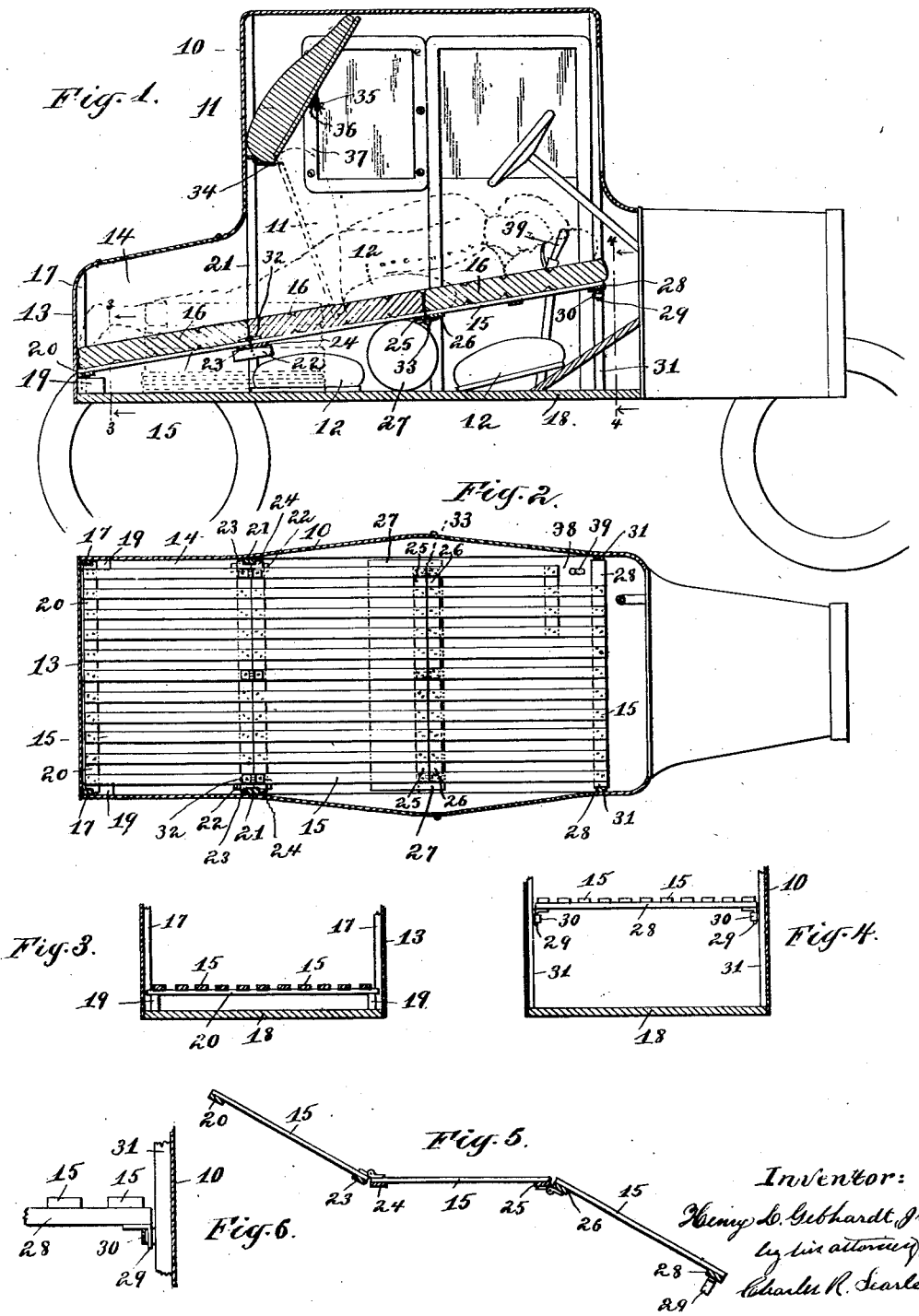

1,609,113

UNITED STATES PATENT OFFICE.

HENRY L. GEBHARDT, JR., OF GRANTWOOD, NEW JERSEY.

AUTOMOBILE BED.

Application filed July 29, 1925. Serial No. 46,749.

The invention relates to foldable beds adapted to be extended within the body of an automobile, and to be folded and carried thereby when not required for occupancy, and the object of the invention is to provide a bed of this character adapted to serve with cars of the coupé type having the usual rear extension or compartment, without requiring any material changes in or additions to the car structure, and which shall be simple in construction and easily set up for occupancy or folded for storage.

The invention consists in certain novel features of construction and arrangement by which the above objects are attained, to be hereinafter described and claimed.

The accompanying drawings form a part of this specification and show the invention as it has been carried out in practice, applied to the well-known Ford coupé.

Figure 1 is a vertical section, partly in elevation, showing the bed conditioned for occupancy, and the locations of the interior car-portions relatively thereto.

Figure 2 is a corresponding plan view, partly in horizontal section, with the mattress portions removed.

Figure 3 is a vertical section, partly in elevation, showing the supporting means for the rear end of the bed frame, the plane of section being indicated by the line 3—3 in Figure 1.

Figure 4 is an elevation, partly in vertical section, showing the means for supporting the front end of the bed frame, the plane of section being indicated by the line 4—4 in Figure 1.

Figure 5 is a longitudinal section partly in elevation, showing the bed frame in the partially folded condition.

Figure 6 is a vertical section and elevation on a larger scale, corresponding to a portion of Figure 4.

Similar reference numerals indicate the same parts in all the figures.

The main body of the car is marked 10 and has the usual single seat with a back 11 and seat cushions 12, and a rear extension 13 forming a rear compartment 14, all of which, with other parts and equipments, partially shown or omitted, may be understood to be as usual in a Ford coupé.

The bed frame comprises a folding rack, preferably in three sections, each composed of two transverse bars on which are fastened the longitudinally extending strips or slats 15 upon which the three removable mattress portions 16 are supported when the bed is in position for service.

On the vertical rear posts 17 of the car body extension 13, adjacent the floor 18, are blocks 19 upon which the rearmost bar 20 of the rear section rests, and on the intermediate posts 21 are similar blocks 22 above the floor 18, on which are supported the front bar 23 of the rear section and the rear bar 24 of the middle rack-section. The front bar 25 of the middle section and rear bar 26 of the front section are supported by the gasoline tank 27, the junction of the middle and front sections lying immediately adjacent such tank, and the front bar 28 of the front rack-section carries at each end a downwardly projecting lug 29 which is received in a housing or socket 30 secured to the front posts 31, see Figures 4 and 6, and thus support the front end of the forward rack section and also hold the whole bed frame against longitudinal movements.

Hinges 32 on the upper face of the rack join the rear and middle rack sections, and hinges 33 on the under face of the bars 25 and 26 join the middle and front sections.

When not in use the rack sections are folded and stored in the rear compartment 14 together with the mattress portions 16 of the bed, as shown in dotted lines in Figure 1, and the car then presents its usual appearance. When the bed is to be set up for use, the back 11 of the seat is lifted and turned upwardly, resting upon the usual transverse bracket 34, in which position it is held by any suitable means, shown as a cord 35 tied to screw-eyes 36 inserted in the window frames 37 on each side of the car, in place of the usual screws at those points, and the seat cushions 12 are placed on the floor in front and rear of the tank 27, as shown. The rack is then removed from the compartment 14 and the rear section of the rack unfolded and thrust rearwardly to rest upon the blocks 19 and 22 with the middle section on the tank, and the unfolded front section placed in position with its lugs 29 engaged in the sockets 30; the rack is thus extended to form a plane lying in a slightly inclined position from front to rear as shown. The mattress portions are then laid upon the rack and the bed is ready for service.

It will be noted that the hinges 32 are so placed as to permit the rear rack section to fold upon the middle section, and the hinges 33 placed to permit the front section to fold beneath the middle section; this arrangement facilitates the introduction of the rear and middle sections in unfolding the rack in the limited space within the car body.

The side slat is omitted at one corner of the front section, as at 38, see Figure 2, for the purpose of accommodating the brake-lever 39 and permitting its manipulation in locating the car and in holding it against accidental movement when located.

Ample room is afforded for a single occupant of the bed and two may be accommodated without undue crowding. The usual Ford coupé permits the introduction of a rack six feet and four inches in length, arranged as shown in the drawings, and in some of the other makes of cars of the coupé type greater space is available.

The invention offers provision for comfortable and convenient sleeping accommodations for tourists, sportsmen, salesmen and others, especially in situations where hotel accommodations are not available. The occupants are protected from the weather, and the car windows and other openings afford ample ventilation and light.

The width of the bed may be reduced by omitting some of the slats 15 on one side, preferably the side having the notch 38 therein, and correspondingly reducing the width of the mattress portions, thereby affording greater available space in the car body 10 and extension 13, and the means for supporting the bed frame within the body and extension may be varied as found necessary or desirable in adapting the invention to various cars of the coupé type.

I claim:—

1. In combination with an automobile of the coupé type, having a rear extension and removable back and seat cushions, a bed frame in transversely divided sections with their abutting ends foldably joined together transversely of the length of the frame, blocks rigidly secured at different heights within said extension below the normal plane of the seats and above the floor of the car for supporting the bed frame at one end and the adjacent section-joint, and means independent of the seats and floor for supporting the remaining portions of the bed frame, said supporting means being disposed to hold the bed frame in an inclined position.

2. In combination with an automobile of the coupé type, having a rear extension and removable seat back and seat cushions, means for supporting and holding said seat back in an elevated position within the body of such car, a bed frame comprising sections foldable upon each other transversely of the length of the frame, each having transverse bars at its ends, adapted to fold and be contained in said rear extension, and to be unfolded to lie within the body of such car below said elevated seat back and to extend into said rear extension in the unfolded condition, lugs on the forward bar of the front section of said frame, sockets located in the front portion of said body and arranged to receive said lugs and support such front section, and means on the interior of said body and extension for supporting the other sections of said frame.

In testimony that I claim the invention above set forth I affix my signature hereto.

HENRY L. GEBHARDT, Jr.